United States Patent [19]
Yada et al.

[11] Patent Number: 5,271,612
[45] Date of Patent: Dec. 21, 1993

[54] STRUCTURAL BODY FOR VEHICLE

[75] Inventors: Seiki Yada, Hiratsuka; Toshio Nagase, Tsukuba; Takamitsu Mikuni, Yokohama; Noboru Hino, Yokohama; Yutaka Kagoshima, Yokohama, all of Japan

[73] Assignees: Nippon Zeon Co., Ltd.; Zeon Kasei Co., Ltd., Tokyo, Japan

[21] Appl. No.: 882,680

[22] Filed: May 13, 1992

[30] Foreign Application Priority Data

May 13, 1991 [JP] Japan .................. 3-135311

[51] Int. Cl.⁵ ............................. B32B 5/16
[52] U.S. Cl. ...................... 267/158; 296/189; 428/246; 428/138
[58] Field of Search ............... 267/148, 149, 158, 151, 267/152, 136, 140.3; 296/146 C; 428/246, 283, 138; 156/330, 338

[56] References Cited

U.S. PATENT DOCUMENTS

| | | | |
|---|---|---|---|
| 4,316,404 | 2/1982 | Medlin | 296/146 C |
| 4,830,916 | 5/1989 | Fukuda et al. | 428/138 |
| 4,969,680 | 11/1990 | Shimoda | 296/146 C |
| 5,002,821 | 3/1991 | Browne et al. | 428/246 |

FOREIGN PATENT DOCUMENTS 2611179 2/1987 France .

OTHER PUBLICATIONS

Database WPIL, No. 87-324 972 Derwent Publications Ltd., Abstract JP-A-62-741.

Primary Examiner—Matthew C. Graham
Attorney, Agent, or Firm—Armstrong, Westerman, Hattori, McLeland & Naughton

[57] ABSTRACT

A vibration-damping structural body for a vehicle, which comprises a sublayer sheet composed of a foamed thermoset resin and fusion-bonded onto a vehicle part, and at least one layer, which is fusion-bonded onto the sublayer and is selected from a damping intermediate sheet (2) comprised of a viscoelastic material and restraining sheet (3). The sublayer sheet (1) is formed from a semi-gelled sheet made by heating a forming and thermosetting resin composition comprising (A) an epoxy resin, (B) a coreacting curing agent, (C) a foaming agent, (D) a surface active agent and (E) a rubber-like elastic material or a powdery thermoplastic resin not containing halogen, which is insoluble in the epoxy resin at room temperature, but is miscible with and dispersible in the epoxy resin at 80° to 150° C.

17 Claims, 1 Drawing Sheet

# STRUCTURAL BODY FOR VEHICLE

BACKGROUND OF THE INVENTION

(1) Field of the Invention

This invention relates to a structural body for vehicles. More particularly, it relates to a vibration-damping rigid structural body which is integrally bonded by a thermal fusion-forming to a part of vehicle, which is subject to vibration such as a floor panel, a dash panel a wheel housing or ceiling panel.

(2) Description of the Related Art

A thermally fusible damping material predominantly comprised of asphalt has been popularly used for damping the vibration of a vehicle part such as a floor panel, a dash panel, a wheel housing or a ceiling panel, the material being fusion-bonded to the vibrating surface of the vehicle part. In recent years, an attempt has been made to provide a rigid metal sheet as a restraining material, such as a steel sheet or an aluminum sheet, on the asphalt damping material, or to laminate a layer of a thermosetting resin such as an epoxy resin, a diallyl phthalate resin or a thermosetting acrylic resin on the asphalt damping material, thereby forming a restraint type vibration-damping structure having a good vibration-damping property and a high rigidity.

Further, another attempt has been made to expand the asphalt damping material for enhancing the vibration-damping property.

However, the above-mentioned vibration-damping structures having the asphalt damping material have the following problems. Namely, a double layer-type vibration-damping structure, which is composed of a vehicle part and the damping material sheet predominantly comprised of asphalt and thermally fused on the vehicle part, must be sufficiently thick to obtain a vibration-damping property of the desired level. This leads to an increase in vehicle weight, and the double layer-type vibration-damping structure does not have a high rigidity. By using an expandable asphalt damping material, an increase in vehicle weight can be lowered, but the vibration-damping property cannot be enhanced to the desired level while the increase in vehicle weight is kept at a practically permissible low level.

In the case of the sandwich type vibration-damping structure wherein a rigid metal sheet such as a steel sheet or an aluminum sheet is laminated on the asphalt damping material layer, the vibration-damping property is satisfactory. To bond the rigid metal sheet as a restraining material to the thermally fused damping material layer, a means for mechanically fixing or screwing with a bolt the metal sheet to the rigid vehicle part is employed. However, the rigid vehicle part such as a floor panel usually has a press-molded shape, and therefore, a step of press-molding the restraining metal sheet into a shape corresponding to the shape of the press-molded vehicle part is needed. Further, it is troublesome to exactly position the restraining metal sheet to the vehicle part. Further, an attempt has been made wherein an uncured thermosetting resin is placed on the damping material and the uncured thermosetting resin is then cured during the step of drying a paint applied thereon, thereby forming a restraining material on the damping material. Another attempt has been made wherein a thermoplastic resin composition containing a tackifying resin as the matrix constituent is placed on the damping material and the thermoplastic resin is cured in the step of drying a paint applied thereon, thereby forming a restraining material. These attempts are useful for enhancing the vibration-damping property, but the need of abating noise within a vehicle is increasing more and more. Therefore, a vibration-damping structural body containing a resin restraining material, which exhibits a higher vibration-damping performance and has a higher rigidity with an increase in weight only of a practically acceptable extent is eagerly desired.

SUMMARY OF THE INVENTION

In view of the foregoing, an object of the present invention is to provide a structural body for a vehicle, which is lightweight and rigid and exhibits a good vibration-damping property and heat resistance.

In accordance with the present invention, there is provided a structural body for a vehicle with a two or three layer structure, which comprises a sublayer sheet comprised of a foamed thermoset resin and fusion-bonded onto a vehicle part, and at least one layer, which is fusion-bonded onto the sublayer sheet and is selected from the following and:

a vibration-damping intermediate sheet comprised of a viscoelastic material selected from rubbers and asphalt, and a restraining sheet fusion-bonded onto one of the sublayer and the vibration-damping intermediate sheet.

The sublayer sheet of the structural body of the invention is characterized as being a semi-gelled sheet made by heating a foaming and thermosetting resin composition comprising (A) 100 parts by weight of an epoxy resin having at least two epoxy groups in the molecule, (B) 0.5 to 20 parts by weight of a coreacting curing agent for the epoxy resin, (C) 0.5 to 20 parts by weight of a foaming agent having a decomposition temperature of 100° to 220° C., (D) 0.05 to 5 parts by weight of a surface active agent, and (E) 10 to 200 parts by weight of at least one material which is insoluble in the epoxy resin at room temperature, but is miscible with and dispersible in the epoxy resin at a temperature of 80° to 150° C., and which is selected from a rubber-like elastic material, and a powdery thermoplastic resin which does not contain a halogen and has an average particle diameter of not larger than 150 um. The heating of the foaming and thermosetting resin composition is carried out at a temperature lower than the decomposition temperature of the foaming agent (C).

Preferably, the structural body for a vehicle of the present invention comprises a three layer structure having (1) the above-mentioned sublayer sheet fusion-bonded onto a vehicle sheet, (2) the vibration-damping intermediate sheet fusion-bonded onto the sublayer sheet, and (3) the restraining sheet fusion-bonded onto the vibration-damping intermediate sheet.

DESCRIPTION OF THE PREFERRED EMBODIMENTS

The structural body for a vehicle of the present invention will be described in detail.

Figure 3:
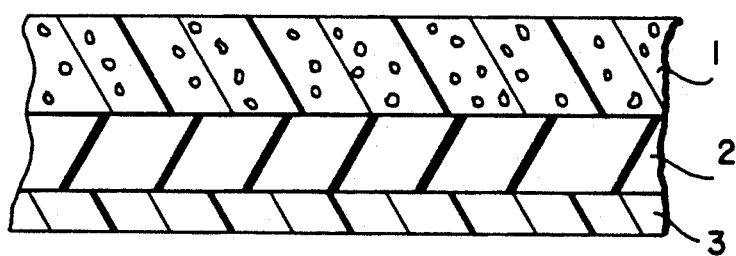
FIG. 3 is a cross-sectional view of a preferred structural body in accordance with the present invention.

Referring now to FIG. 3 sublayer sheet (1) in the structural body of the present invention is a foamed thermoset resin sheet having a function of a spacer. It is desired that a spacer sheet used in a vibration-damping structural body for a vehicle is lightweight, has a high rigidity, exhibits a low variation of physical properties depending upon the temperature change, and is capable of adhering onto a vibrating non-flat vehicle part, being cured and being foamed at a high expansion ratio in a coating and drying step.

The foaming and thermosetting resin composition used for the spacing sublayer sheet (1) contains a liquid epoxy resin (A) having at least two epoxy groups in the molecule. As the epoxy resin (A), there can be mentioned, for example, a bisphenol A-, bisphenol F- or resorcinol-based glycidyl ether; a polyglycidyl ether of a phenol-novolak resin or a cresol-novolak resin; a glycidyl ether of hydrogenated bisphenol A; glycidyl amine; a linear aliphatic epoxide; and a glycidyl ether of phthalic acid, hexahydrophthalic acid or tetrahydrophthalic acid. These epoxy resins may be used either alone or in combination, and preferably have an epoxy equivalent of 100 to 300. To impart a toughness to the foamed and thermoset resin, a flexible epoxy resin such as an ethylene oxide-added or propylene oxide-added bisphenol A-type epoxy resin, a dimer acid-type epoxy resin or an epoxy-modified NBR can be used in combination with the above-mentioned epoxy resins.

The foaming and thermosetting resin composition used for the spacing sublayer sheet (1) contains a coreacting curing agent for the epoxy resin (B). Preferably, the coreacting curing agent exhibits an exotherm peak temperature of 100° to 200° C. as used in combination with the particular epoxy resin. The term "exotherm peak temperature" as used herein means the temperature of a medium at which the exotherm due to the curing of the epoxy resin reaches the peak when a mixture of the epoxy resin and the coreacting curing agent in the medium is heated, for example, in an oil bath or by a heater.

As typical examples of the preferable coreacting curing agents, there can be mentioned dicyandiamide, 4,4'-diaminodiphenyl sulfone, imidazole derivatives such as 2-n-heptadecylimidazole, isophthalic dihydrazide, N,N-dialkylthiourea derivatives, acid anhydrides such as tetrahydrophthalic anhydride, isophoronediamine, m-phenylenediamine, N-aminoethylpiperazine, trifluoroboric acid complex compounds, and tris(dimethylaminomethyl)phenol. These coreacting curing agents may be used either alone or in combination.

The amount of the coreacting curing agent is 0.5 to 20 parts by weight based on 100 parts by weight of the epoxy resin (A). If the amount of the curing agent is smaller than 0.5 part by weight, curing is insufficient and the foamed thermoset resin sublayer sheet has poor rigidity. In contrast, if the amount of the curing agent is larger than 20 parts by weight, the rigidity of the sublayer sheet does not increase in proportion as the increase of the amount thereof and it is not advantageous from a cost consideration. The optimum combination of the epoxy resin and the coreacting curing agent and the optimum amounts thereof can be easily determined by pretests depending upon the particular heating conditions.

If desired, a curing promoter can be used in combination with the coreacting curing agent (B). The curing promoter includes, for example, alcohols, phenols, mercaptans, dimethylureas, imidazoles and chlorotoluene.

The foaming and thermosetting resin composition used for the spacing sublayer sheet (1) further contains a high-temperature-decomposing type foaming agent (C) having a decomposition temperature of 100° to 220° C. If a foaming agent having a decomposition temperature lower than 100° C. is used, when the semi-gelled sheet is processed, undesirable foaming occurs, or, during the step of heating the semi-gelled sheet for foaming in a heating furnace, a premature expansion occurs and the gas is expelled from the resin composition while the resin composition is not yet sufficiently molten, with the result that the foaming is not uniform and the extent of foaming is low. In contrast, if a foaming agent having a decomposition temperature exceeding 220° C. is used, the resin composition must be processed at a high temperature, and thus, the resin is thermally degraded and the foamed resin sheet is of a poor quality.

The foaming agents (C) used in the foaming and thermosetting resin composition for the spacing sublayer sheet include organic foaming agents, inorganic foaming agents and high-temperature-swelling type microcapsules. As the organic foaming agents, there can be mentioned, for example, azodicarbonamide, p-toluenesulfonyl hydrazide, dinitrosopentamethylenetetramine and 4,4'-oxybis(benzene sulfonyl hydrazide). The decomposition temperature of these organic foaming agents can be easily varied by adding a decomposition temperature regulator such as urea, a zinc compound or a lead compound. As the inorganic foaming agents, there can be mentioned, for example, sodium bicarbonate and boron sodium hydride. As the high-temperature-swelling type micro-capsules, there can be mentioned, for example, a low-boiling hydrocarbon capsulated with polyvinylidene chloride. These foaming agents can be used either alone or in combination. Of these organic foaming agents, inorganic foaming agents and high-temperature-swelling type microcapsules, organic foaming agents are preferable in view of the extent of foaming and the cost.

The amount of the foaming agent is 0.5 to 20 parts by weight per 100 parts by weight of the epoxy resin (A). If the amount of the foaming agent is smaller than 0.5 part by weight, foaming is insufficient. In contrast, if the amount of the foaming agent is larger than 20 parts by weight, the extent of foaming does not increase in proportion as the increase of the amount thereof and the foam cells are rough and not uniform.

To obtain a compact foamed resin sublayer sheet (1) having a uniform cell size and a rigid cell wall, the foaming agent preferably has a diameter as small as possible. For example, a foam having a cell diameter of 0.1 to 0.6 mm, more preferably about 0.3 mm, can be formed from a foaming agent having a particle diameter of smaller than 20 um, preferably smaller than 10 um. A foaming agent with a uniform diameter is especially preferable.

If desired, a foaming promoter can be used in combination with the foaming agent. The foaming promoter includes, for example, calcium stearate, barium stearate, sodium or potassium compounds, or urea.

To provide a foamed sublayer sheet having a good cell structure, a surface active agent (D) is incorporated in the foaming and thermosetting resin composition for the spacing sublayer sheet (1). As the surface active agents used, there can be mentioned anionic surface active agents, for example, salts of alkyl sulfates such as sodium lauryl sulfate and sodium myristyl sulfate, salts of alkyl arylsulfonates such as dodecyl benzenesulfonate and potassium benzenesulfonate, salts of sulfosuccinates such as sodium dioctyl sulfosuccinate and sodium dihexyl sulfosuccinate, fatty acid salts such as ammonium laurate and potassium stearate, salts of polyoxyethylene arylsulfates, and rosinates; nonionic surface active agents, for example, sorbitan esters such as sorbitan mono-oleate and polyoxyethylene sorbitan monostearate, polyoxyethylene ethers, polyoxyethylene alkyl phenyl ethers, and polyoxyethylene alkyl esters; and cationic surface active agents, for example, cetyl pyridinium chloride and cetyl trimethyl ammonium bromide. These surface active agents can be used either alone or in combination.

The amount of the surface active agent (D) is 0.05 to 5 parts by weight, preferably 0.2 to 3 parts by weight, per 100 parts by weight of the liquid epoxy resin (A). If the amount of the surface active agent is smaller than 0.05 part by weight, the cell structure of the resulting foamed sublayer sheet is not stable and is of a poor quality. Even if the amount of the surface active agent exceeds 5 parts by weight, the stability of the cell structure is not enhanced in proportion as the increase of the amount thereof and in some cases undesirable coloration occurs due to the decomposition at the heating step.

The procedure by which the surface active agent is added is not particularly limited, but, when the rubber-like elastic material or the thermoplastic resin (E) is powdery, it is advantageous that a solution of the surface active agent is sprayed on the powdery material whereby the surface active agent is uniformly absorbed.

The foaming and thermosetting resin composition used for the spacer sublayer sheet contains at least one material (E) which is insoluble in the epoxy resin at room temperature, but is miscible with and dispersible in the epoxy resin (A) at a temperature of 80° to 150° C., and which is selected from (E-1) a rubber-like elastic material, and (E-2) a powdery thermoplastic resin which does not contain a halogen and has an average particle diameter of not larger than 150 µm. The rubber-like elastic material (E-1) may be either a solid or a viscous liquid. The powdery thermoplastic resin (E-2) must have an average particle diameter of not larger than 150 µm. Preferably, the rubber-like elastomer and the powdery thermoplastic resin are capable of being molten to form a uniform dispersion in the epoxy resin (A) when the foaming and thermosetting resin composition is heated to a temperature of at least 150° C., and the melt viscosity can be stably maintained.

As the rubber-like elastomer (E-1), there can be mentioned, for example, a chloroprene rubber, a butadiene-acrylonitrile rubber, a carboxyl-modified butadiene-acrylonitrile rubber, an epoxy-modified butadiene-acrylonitrile rubber, a butadiene rubber and an isoprene rubber. As the thermoplastic resin (E-2), there can be mentioned an ethylene-vinyl acetate copolymer, a polyphenylene ether, an ethylene-vinyl alcohol copolymer, an acrylonitrile-styrene copolymer, a polyamide, polyvinyl butyral, polyvinyl acetal, polymethyl methacrylate, an acrylonitrile-butadiene-styrene copolymer, a methyl methacrylate-butadiene-styrene copolymer and polystyrene. These materials may be used either alone or in combination.

The rubber-like elastomer and the powdery thermoplastic resin have a function of adjusting the melt viscosity of the foaming and thermosetting resin composition and enhancing the toughness of the foamed and thermoset resin sublayer. The amount of the rubber-like elastomer and the powdery thermoplastic resin are 10 to 200 parts by weight per 100 parts by weight of the epoxy resin, although appropriate amounts of the rubber-like elastomer and the powdery thermoplastic resin vary depending upon the particular elastomer and thermoplastic resin. If the amount of these materials is smaller than 10 parts by weight, the intended advantage of adjusting the melt viscosity of the foaming resin composition and enhancing the toughness of the foamed and thermoset resin sublayer cannot be obtained. In contrast, if the amount of these materials is larger than 200 parts by weight, problems arise such that the expansion ratio at the foaming is undesirably low and the rigidity of the foamed and thermoset resin sublayer is low.

It is crucial that the epoxy resin (A) and the rubber-like elastomer and/or the powdery thermoplastic resin (E) have a balanced affinity to each other. For this purpose, the kind, molecular weight, particle diameter, amount and other factors of the component (E) should be determined. Preferably, the rubber-like elastomer and the powdery thermoplastic resin (E) are not completely compatible with, but dispersible, in the epoxy resin (A) in the molten state. Therefore, a plasticizer can be added to enhance or adjust the affinity of the components (A) and (B) depending upon the particular combination of the components (A) and (B).

The plasticizer also has a function of adjusting the melt viscosity of the foaming and thermosetting resin composition. As the plasticizer, there can be mentioned conventional plasticizers, for example, phthalic esters such as dioctyl phthalate and dibutyl phthalate, phosphoric esters such as tricresyl phosphate, fatty esters such as dioctyl adipate, a condensate of adipic acid with ethylene glycol, trimellitic esters, glycolic esters, chlorinated paraffin and alkyl benzenes.

If desired, a diluent for the epoxy resin (A) can be added to improve the handling, such as mixing, of the foaming and thermosetting resin composition or to increase the amount of a filler added to the resin composition. As the diluents, there can be mentioned reactive diluents such as butyl glycidyl ether, allyl glycidyl ether, phenyl glycidyl ether and cresyl glycidyl ether, and non-reactive diluents such as dibutyl phthalate, dioctylphthalate, butyl benzyl phthalate, tricresyl phosphate, acetyl tributyl citrate, aromatic process oil, pine oil and 2,2,4-trimethyl-1,3-pentanediol isobutyrate.

If desired, a thixotropic agent and a filler are added to the foaming and thermosetting resin composition to enhance the coating characteristics such as processability and viscosity or to reduce the cost. As the thixotropic agent, there can be mentioned, for example, silicic anhydride and hydrous silicic acid; organic bentonite and other bentonites chrysotile and other asbestos; and dibenzylidene sorbitol and other organic thixotropic agents. As the filler, there can be mentioned, for example, calcium carbonate, mica, talc, kaolin clay, Celite, asbestos, perite, barite, silica, silica sand, flake graphite, dolomite, limestone, gypsum and powdery aluminum. A pigment also may be added, if desired.

The foaming and thermosetting resin composition for the spacer sublayer sheet (1) can be prepared by mixing together predetermined amounts of the above-mentioned ingredients (A), (B), (C), (D) and (E) and optional additive ingredients by a mixing means, for example, a planetary mixer, a kneader, a roll or a Henschel mixer.

The foaming and thermosetting resin composition preferably exhibits a melt viscosity of $2.5 \times 10^3$ to $5 \times 10^4$ dPa.s when the foaming agent contained therein is heated to a decomposed gas-evolving temperature. When the melt viscosity is outside this range, a foamed thermoset resin sublayer sheet having a good appearance and an average cell diameter of not larger than 0.5 mm and expanded at an expansion ratio of at least 5 is difficult to obtain.

The foaming and thermosetting resin composition is used in the form of a semi-gelled sheet for the preparation of the structural body for a vehicle. Namely, the prepared resin composition is shaped into a semi-gelled sheet at a temperature lower than the decomposition temperature of the foaming agent. Preferably, the intermediate vibration-damping sheet (2) is laminated on the semi-gelled sheet, and the laminate is then heated to a temperature of 120° to 200° C. at the succeeding heating step, for example, at a coating and drying step, whereby the semi-gelled sheet is foamed and the epoxy resin is cured to yield a rigid sheet.

The expansion ratio at which the semi-gelled sheet is foamed is usually 2 to 30, preferably 5 to 10. When the expansion ratio is smaller than 2, the foamed thermoset resin sheet is not satisfactory in lightweight properties. When the expansion ratio is larger than 30, the foamed thermoset resin sheet has a poor tenacity and, in many cases, the resulting structural body has a low durability.

The spacer sublayer sheet (1) of the foamed thermoset resin preferably has a thickness of 1 to 50 mm, more preferably 3 to 30 mm. If the thickness of the sheet is smaller than 1 mm, the sheet is not satisfactory in the function as a spacer. If the thickness is larger than 50 mm, the sheet is of little or no practical use as a structural body for vehicles, and a uniform foaming cannot be obtained at the foaming step.

The intermediate vibration-damping sheet (2) is comprised of a viscoelastic material which is not particularly limited and is selected from rubbers and asphalt. However, the intermediate damping sheet must be capable of being fusion-bonded onto the spacer sublayer sheet and the restraining sheet and exhibit a good adaptability to vehicles such as good follow-up properties to vibrating vehicle parts. In view of these requirements and from consideration of vibration-damping capability, cost and lightweight property, asphalt, foamed asphalt and butyl rubber are preferable as the intermediate damping sheet (2).

The intermediate damping sheet preferably has a thickness not larger than 10 mm, more preferably not larger than 2 mm. An intermediate sheet having a thickness larger than 10 mm is not satisfactory in weight. There is no lower limit in terms of thickness of the intermediate sheet because the structural body of the present invention has the spacer sublayer sheet and the optional restraining sheet, and therefore, the intermediate sheet exhibits a good vibration-damping capability even though its thickness is small.

The restraining sheet (3) has a function of restraining the deformation of the damping intermediate sheet caused by the vibration, and imparting a shearing deformation to the intermediate sheet to ensure the desired vibration-damping function of the intermediate sheet. The restraining sheet should be made of a material having properties which are similar to those required for the above-mentioned sublayer sheet (1) and intermediate sheet (2), and thus, the restraining sheet should have a good fusion-bondability to the intermediate sheet and a good adaptability to vehicles such as follow-up capability to the shape of a vibrating vehicle part. Preferably, the restraining sheet has a high modulus of elasticity.

As preferred examples of the material for the restraining sheet, there can be mentioned a thermoplastic resin having incorporated therein a tackifier such as a rosin resin, a terpene resin, an aliphatic petroleum resin, an aromatic petroleum resin or a coumarone-indene resin, or a thermosetting plastic material containing a rubber as the basic polymer such as a butadiene rubber or a styrene-butadiene rubber.

The thickness of the restraining sheet (3) is not particularly limited, but is preferably in the range of about 0.5 to 3 mm in view of the required properties which are similar to those of the sublayer sheet and the intermediate sheet.

The structural body of the present invention can be made by various procedures. In one example, the sublayer sheet and the intermediate sheet and/or the restraining sheet are placed on a vibrating vehicle part, and these are heated, e.g., at the coating and drying steps thereby to fusion-bond the three sheets together and expand the sublayer. Simultaneously, the three sheets are allowed to follow-up the shape of the vibrating vehicle part. In another example, the sublayer sheet and the intermediate sheet and/or the restraining sheet are laminated together, and the laminate is placed on a vibrating vehicle part, followed by heating to fusion-bond the three sheets and expand the sublayer sheet, and simultaneously allow the laminate to follow-up the shape of the vehicle part. Any combination of two sheets, for example, a combination of the intermediate sheet with the restraining sheet or a combination of the sublayer sheet with the intermediate sheet, may be laminated together prior to the fusion-bonding to the vibrating vehicle part.

The invention will now be described specifically by the following examples that by no means limit the scope of the invention.

The materials and the vibrating substrate, used for the test in the examples are as follows.

(a) Vibrating substrate:

A steel sheet having a thickness of 0.8 mm.

(b) Sublayer sheet (spacer sheet):

The ingredients shown in Table 1 were mixed together for 20 minutes, and the mixture was coated on release paper at a predetermined thickness. The coating was heated at 120° C. for 100 seconds to prepare a semi-gelled sheet.

(c) Intermediate sheet (damping sheet):

Asphalt type vibration-damping sheet. The thickness was previously adjusted to a predetermined value by a hot press.

TABLE 1

| Material | | Resin composition for spacer sublayer sheet (parts by weight) | | | | |
| --- | --- | --- | --- | --- | --- | --- |
| | | A | B | C | D | E |
| (A) | Bisphenol-A type epoxy resin | 140 | 100 | 100 | 100 | 100 |
| (B) | Dicyandiamide | 10 | 3 | 3 | 3 | 3 |

TABLE 1-continued

| Material | Resin composition for spacer sublayer sheet (parts by weight) | | | | |
|---|---|---|---|---|---|
| | A | B | C | D | E |
| (C) Azodicarbonamide | 5 | 5 | 5 | 5 | 5 |
| (D) Anionic surface active agent | 0.5 | 0.5 | 0.5 | 0.5 | 0.5 |
| (E) MMA/EA copolymer | 100 | — | — | — | 220 |
| Ethylene-vinyl acetate copolymer | — | 100 | — | — | — |
| Epoxy-modified NBR | — | — | 100 | — | — |
| Vinyl chloride-vinyl acetate copolymer | — | — | — | 100 | — |
| Dimethylurea curing promoter | 3 | — | — | — | — |
| Dibutyl phthalate | 30 | 30 | 30 | 30 | 10 |
| Ba/Zn type organic foaming promoter | 3 | 3 | 3 | 3 | 3 |
| Ground calcium carbonate | 30 | 60 | 30 | 30 | 30 |
| Aerosil | 5 | 5 | 5 | 5 | 5 |
| Ca/Zn type heat stabilizer | — | — | — | 3 | — |
| Melt viscosity (dPa · s) | 26000 | 19000 | 7800 | 26000 | 96000 |

(d) Restraining sheet

The ingredients of a thermoplastic resin composition shown in Table 2 were melt-mixed at 200° C. in an autoclave. The resulting mixture was subjected to hot pressing to adjust the thickness to a predetermined value (material G).

The ingredients of a thermosetting resin composition shown in Table 3 were kneaded by a roll into a sheet having a predetermined thickness (material H).

TABLE 2

| Resin composition for restraining sheet (parts by weight) | |
|---|---|
| Material | G |
| Tackifier resin *1 | 100 |
| Polyethylene *2 | 50 |
| Epoxidized soybean oil | 5 |
| Glass fiber | 20 |
| Calcium carbonate | 100 |

*1 Aliphatic hydrocarbon resin
*2 Density: 0.951, MI: 21, Melting point: 132° C.

TABLE 3

| Resin composition for restraining sheet (parts by weight) | |
|---|---|
| Material | H |
| Butadiene rubber | 100 |
| Diallyl phthalate *1 | 100 |
| Vulcanizer *2 | 5 |
| Calcium carbonate | 600 |
| Carbon | 20 |
| Sulfur | 2 |
| Vulcanizing accelerator *3 | 1.5 |

*1 Reactive plasticizer
*2 t-Butyl perbenzoate
*3 Tetramethylthiuram disulfide

The test methods are as follows.

The spacer sublayer sheet, the intermediate sheet and the restraining sheet were placed on a steel sheet having a size of 15 mm×300 mm×0.8 mm (thickness) and the assembly was heated at 150° C. for 30 minutes in an oven whereby fushion bonding of the sheets and foaming of the sublayer sheet were effected. The loss factor of the thus-prepared structural body was determined at 20° C., 40° C. and 60° C. The loss factor was determined at a frequency of 200 Hz by calculation from the half-value width at the resonance point of the mechanical impedance and interpolation of the calculated value. The frequency employed was in the range of 1 to 1,000 Hz.

The stiffness ratio was determined by the following formula:

$$\text{Stiffness ratio} = (f_o/f)^2[(m_1+m_2)/m_1]$$

wherein $f_o$ is resonant frequency of the structural body composed of the spacer sheet, the intermediate sheet, the restraining sheet and the steel sheet, f is resonant frequency of the steel sheet alone, $m_1$ is areal density of the steel sheet, $m_2$ is areal density of the spacer sublayer sheet, the intermediate sheet and the restraining sheet.

Figure 1:
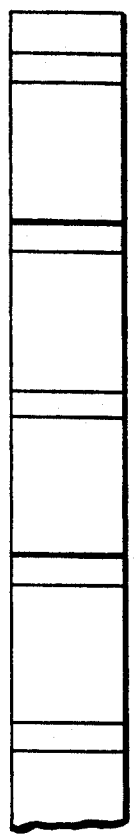
FIG. 1 is a front view of a press-molded steel sheet used for the test of a follow-up property.
Figure 2:
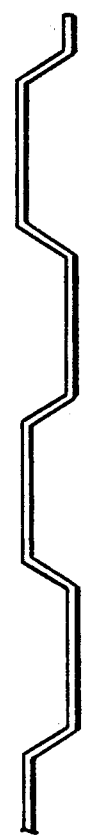
FIG. 2 is a side view of the press-molded steel sheet.

The follow-up properties of the respective sheets were evaluated as follows. Each of the spacer sheet, the intermediate sheet and the restraining sheet was cut into a size of 20 mm×250 mm. The thus-prepared sample was placed on a corrugated steel sheet having a shape shown in FIG. 1 and FIG. 2 so that the sample lies roughly along the corrugated surface of the steel sheet. The height of the ridges of the corrugated surface was 7.8 mm. The assembly of the steel sheet and the sheet sample was placed in an oven and exposed to the same heating conditions as employed for fusion-bonding the three sheets, i.e., at 150° C. for 30 minutes. After the heated assembly was taken out from the oven, the state of adhesion of the sheet sample to the corrugated steel sheet was observed.

The evaluation results are shown in Tables 4 and 5.

TABLE 4

| Constitution and properties of damping structural bodies | | | | | |
|---|---|---|---|---|---|
| Examples | Ex. 1 | Ex. 2 | Ex. 3 | Ex. 4 | Ex. 5 |
| Sublayer sheet: | | | | | |
| Kind of material | A | B | C | A | A |
| Thickness before foaming (mm) | 1.5 | 1.5 | 1.5 | 1.0 | 1.5 |
| Thickness after foaming (mm) | 9.8 | 11.3 | 10.8 | 7.0 | 10.2 |
| Expansion ratio | 6.5 | 7.5 | 7.2 | 7.0 | 6.8 |
| Average cell diameter (mm) | 0.2 | 0.2 | 0.2 | 0.3 | 0.3 |
| Appearance of foam | Good*1 | Good | Good | Good | Good |
| Melt viscosity (dPa · s) | 26,000 | 19,000 | 7,800 | 26,000 | 26,000 |
| Intermediate sheet: | | | | | |
| Kind of material | F | F | F | F | F |
| Thickness (mm) | 1.0 | 1.0 | 1.0 | 1.0 | 1.0 |
| Restraining sheet: | | | | | |

TABLE 4-continued

Constitution and properties of damping structural bodies

| Examples | Ex. 1 | Ex. 2 | Ex. 3 | Ex. 4 | Ex. 5 |
|---|---|---|---|---|---|
| Kind of material | G | G | G | G | H |
| Thickness (mm) | 1.5 | 1.5 | 1.5 | 1.0 | 1.5 |
| Loss factor: | | | | | |
| at 20° C. | 0.25 | 0.23 | 0.26 | 0.21 | 0.25 |
| 40° C. | 0.31 | 0.34 | 0.33 | 0.28 | 0.34 |
| 60° C. | 0.40 | 0.45 | 0.41 | 0.38 | 0.38 |
| Stiffness ratio: | | | | | |
| at 20° C. | 62 | 48 | 55 | 41 | 59 |
| 40° C. | 51 | 33 | 39 | 32 | 43 |
| 60° C. | 38 | 25 | 30 | 26 | 31 |
| Follow-up property: | Good | Good | Good | Good | Good |

*1: "Good" means that the sample was entirely adhered onto the corrugated steel sheet.

TABLE 5

Constitution and properties of damping structural bodies

| Comparative Examples | Comp. Ex. 1 | Comp. Ex. 2 |
|---|---|---|
| Sublayer sheet: | | |
| Kind of material | D | E |
| Thickness before foaming (mm) | 1.5 | 1.5 |
| Thickness after foaming (mm) | 9.9 | 5.4 |
| Expansion ratio | 6.6 | 3.6 |
| Average cell diameter (mm) | 0.5 | 0.5 |
| Appearance of foam | *1 | Bad |
| Melt viscosity (dPa · s) | 26,000 | 96,000 |
| Intermediate sheet: | | |
| Kind of material | F | F |
| Thickness (mm) | 1.0 | 1.0 |
| Restraining sheet: | | |
| Kind of material | G | G |
| Thickness (mm) | 1.5 | 1.5 |
| Loss factor: | | |
| at 20° C. | 0.22 | 0.28 |
| 40° C. | 0.35 | 0.30 |
| 60° C. | 0.39 | 0.33 |
| Stiffness ratio: | | |
| at 20° C. | 42 | 32 |
| 40° C. | 26 | 21 |
| 60° C. | 8 | 14 |
| Follow-up property: | Good | Good |

*1: Thermally decomposed

As seen from the examples of the invention, the structural bodies for a vehicle of the invention are rigid and thermally resistant, and have a compact cell structure with a small average cell diameter, i.e., smaller than 0.4 mm, with an expansion ratio of at least 5. The vibration-damping capability (expressed by the loss factor) and the follow-up property to the shape of a vibrating part are also satisfactory.

The structural body of the invention has a restraint type vibration-damping structure with a spacer sublayer which is rigid and thermally resistant and has a compact cell structure with a high expansion ratio. The structural body exhibits a good vibration-damping property and a large rigidity over a broad temperature range. Therefore, the structural body of the invention has a function of restraining a noise, and imparting a toughness and thermal insulation to vehicle parts, such as a floor panel, dash panel, a wheel housing and a ceiling panel.

What is claimed is:

1. A structural body for a vehicle with a two or three layer structure, which comprises a sublayer sheet comprised of a foamed thermoset resin fusion-bonded onto a vehicle part, and at least one layer fusion-bonded onto the sublayer sheet and selected from the group consisting of the following:

a vibration-damping intermediate sheet comprised of a viscoelastic material selected from the group consisting of rubber and asphalt, and a restraining sheet fusion-bonded onto one of the sublayer and the vibration-damping intermediate sheet;

wherein said sublayer sheet is formed from a semi-gelled sheet made by heating a foaming and thermosetting resin composition comprising:

(A) 100 parts by weight of an epoxy resin having at least two epoxy groups in the molecule, (B) 0.5 to 20 parts by weight of a coreacting curing agent for the epoxy resin, (C) 0.5 to 20 parts by weight of a foaming agent having a decomposition temperature of 100° to 220° C., (D) 0.05 to 5 parts by weight of a surface active agent, and (E) 10 to 200 parts by weight of at least one material which is insoluble in the epoxy resin at room temperature, but is miscible with and dispersible in the epoxy resin at a temperature of 80° to 150° C., and which is selected from the group consisting of a rubber-like elastic material, and a powdery thermoplastic resin which does not contain a halogen and has an average particle diameter of not larger than 150 μm; said heating of the foaming and thermosetting resin composition being carried out at a temperature lower than the decomposition temperature of the foaming agent (C).

2. A structural body for a vehicle according to claim 1 which has a three layer structure comprising the sublayer sheet adapted to be fusion-bonded onto a vehicle part, the vibration-damping intermediate sheet fusion-bonded onto the sublayer sheet, and the restraining sheet fusion-bonded onto the vibration-damping intermediate sheet.

3. A structural body for a vehicle according to claim 1 wherein the epoxy resin (A) has an epoxy equivalent of 100 to 300.

4. A structural body for a vehicle according to claim 1 wherein the coreacting curing agent exhibits an exotherm peak temperature of 100° to 200° C. as used in combination with the particular epoxy resin.

5. A structural body for a vehicle according to claim 1 wherein said foaming and thermosetting resin composition further comprises a curing promoter.

6. A structural body for a vehicle according to claim 1 wherein the foaming agent (C) is an organic foaming agent.

7. A structural body for a vehicle according to claim 1 wherein the foaming agent is a powder having a particle diameter of smaller than 20 μm.

8. A structural body for a vehicle according to claim 1 wherein said foaming and thermosetting resin composition further comprises a foaming promoter.

9. A structural body for a vehicle according to claim 1 wherein the powdery thermoplastic resin has a particle diameter of not larger than 150 μm.

10. A structural body for a vehicle according to claim 1 wherein the rubber-like elastic material and the powdery thermoplastic resin (E) are capable of being molten to form a uniform dispersion in the epoxy resin (A)

when the foaming and thermosetting resin composition is heated to a temperature of at least 150° C.

11. A structural body for a vehicle according to claim 10 wherein the rubber-like elastic material and the powdery thermoplastic resin (E) are not completely compatible with but are dispersible in the epoxy resin (A) in a molten state.

12. A structural body for a vehicle according to claim 1 wherein said foaming and thermosetting resin composition further comprises a diluent for the epoxy resin (A).

13. A structural body for a vehicle according to claim 1 wherein said foaming and thermosetting resin composition exhibits a melt viscosity of $2.5 \times 10^3$ to $5 \times 10^4$ dPa.s when the foaming agent is heated to a decomposed gas-evolving temperature.

14. A structural body for a vehicle according to claim 1 wherein the sublayer sheet is formed by heating the semi-gelled sheet at an expansion ratio of 2 to 30 and has a thickness of 1 to 50 mm.

15. A structural body for a vehicle according to claim 1 wherein the vibration-damping intermediate sheet is made of butyl rubber and has a thickness of not larger than 10 mm.

16. A structural body for a vehicle according to claim 1 wherein the restraining sheet is made of a thermoplastic resin having incorporated therein a material selected from the group consisting of a tackifier, and a thermosetting plastic material predominately comprised of rubber, and has a thickness of 0.5 to 3 mm.

17. A structural body for a vehicle according to claim 1 wherein the vibration-damping intermediate sheet is made of asphalt and has a thickness of not larger than 10 mm.

* * * * *